United States Patent
Nordhielm et al.

(10) Patent No.: US 7,899,835 B2
(45) Date of Patent: Mar. 1, 2011

(54) METHOD AND SYSTEM FOR REVIEWING BUSINESS ACTIVITY OF A BUSINESS ENTITY

(75) Inventors: Bradley D. Nordhielm, Washington, IL (US); Michele R. Ludwig, El Paso, IL (US)

(73) Assignee: Caterpillar, Inc., Peoria, IL (US)

( * ) Notice: Subject to any disclaimer, the term of this patent is extended or adjusted under 35 U.S.C. 154(b) by 379 days.

(21) Appl. No.: 12/071,979

(22) Filed: Feb. 28, 2008

(65) Prior Publication Data

US 2009/0222484 A1 Sep. 3, 2009

(51) Int. Cl.
*G06F 17/30* (2006.01)

(52) U.S. Cl. .................................. 707/758; 707/812

(58) Field of Classification Search ................. 707/758, 707/812
See application file for complete search history.

(56) References Cited

U.S. PATENT DOCUMENTS

| | | |
|---|---|---|
| 6,651,062 B2 | 11/2003 | Ghannam et al. |
| 6,677,963 B1 | 1/2004 | Mani et al. |
| 6,845,378 B1 | 1/2005 | Pauly et al. |
| 6,853,994 B1 | 2/2005 | Gupta |
| 6,995,768 B2 | 2/2006 | Jou et al. |
| 7,003,504 B1 | 2/2006 | Angus et al. |
| 7,095,829 B2 | 8/2006 | Claudatos et al. |
| 7,136,873 B2 | 11/2006 | Smith et al. |
| 7,149,729 B2 | 12/2006 | Kaasten et al. |
| 7,231,612 B1 | 6/2007 | Mani et al. |
| 7,302,436 B2 | 11/2007 | Qubti et al. |
| 2006/0059185 A1 | 3/2006 | Bocking et al. |
| 2006/0129441 A1 | 6/2006 | Yankovich et al. |
| 2006/0212487 A1 | 9/2006 | Kennis et al. |

OTHER PUBLICATIONS

IBM, "Workload Scheduling Suite: General Information, Version 8.3," Fifth Edition, Dec. 2006, 92 pgs.
IBM, "IBM Tivoli Monitoring, Solutions for Performance and Availability," Dec. 2002, 12 pgs.
IBM, "IBM Tivoli Workload Scheduler for z/OS Version 8.1," Oct. 23, 2001, 13 pgs.

*Primary Examiner*—Neveen Abel Jalil
*Assistant Examiner*—Son T Hoang
(74) *Attorney, Agent, or Firm*—Finnegan, Henderson, Farabow, Garrett & Dunner

(57) ABSTRACT

A method of reviewing business activity data of a business entity includes maintaining ticket records for a plurality of human-implemented jobs performed at a business entity. The method further includes monitoring business activities that occur on a computer system, and storing in a first log a first record for each of the activities. The method additionally includes automatically extracting from the first log a set of second records including a record for each business activity from the first log that indicates that a job was initiated, viewed, altered, rerun, or deleted by a human. The method further includes automatically extracting from the set of second records a set of third records. If a record in the set of third records indicates that a job was initiated, altered, rerun, or deleted by a human and does not have a corresponding ticket record, the record is flagged.

17 Claims, 8 Drawing Sheets

Fig. 6

Date ____
Time ____
Implementer ____
Location ____
Action ____
Action Description ____ ____
...

600

METHOD AND SYSTEM FOR REVIEWING BUSINESS ACTIVITY OF A BUSINESS ENTITY

TECHNICAL FIELD

The disclosed embodiments are directed to a method and system for reviewing data, and more particularly to a method and system for reviewing business activity of a business entity.

BACKGROUND

Due to regulations such as those required under the Sarbanes-Oxley Act of 2002, business entities (e.g., corporations and other organizations) must keep records for a large amount of information related to the business entity's financial activity. Financial activities, or activities which affect the business entity's financial status, may include, for example, payroll activities (e.g., payments made to employees, adjustment to employee salary, automated tax withdrawal amounts, etc.), accounts payable activities (e.g., receipt of loan amounts, receipt of goods, service fees due, etc.), accounts receivable activities (e.g., invoiced sales, services rendered, etc.), general ledgers activities, and other activities. Certain financial activities within the business entity are initiated or otherwise carried out by humans. These activities may be recorded by an employee, for example, on tickets, which may each maintain a record of information related to each activity. Tickets may be maintained, for example, electronically or on paper or other recording media. A ticket serves as an individual record of the activity, and may include information such as, for example, date, time, implementer, location, action, action description, etc.

All of the tickets generated within the business entity may be maintained in a filing system, such as a database or other data storage. Ideally, every financial activity implemented by a human at a business entity would have an associated ticket that includes the correct information regarding the activity. This would include original tickets as well as change tickets, which record changes to previous activities recorded in original tickets or other change tickets. However, the individual records represented by tickets are prone to human error, such as, for example, typographical errors or other data entry mistakes. In addition, individual records are not immune from unauthorized tampering or falsification. For example, an employee may shift certain funds to an offshore account without creating the appropriate ticket. Or, an employee may create a ticket, but later may alter the monetary amounts recorded on the ticket without authorization and without creating a change ticket. Given the strict regulations imposed by the government, business entities must develop effective ways to monitor and audit the activities of their employees that affect their finances.

One business entity monitoring system is described in U.S. Patent Application Publication No. 2006/0212487 A1, to Kennis et al., entitled "Methods and Systems for Monitoring Transaction Entity Versions for Policy Compliance." The '487 publication describes a monitoring system that monitors financial transactions at a business entity, stores information about the transactions in a database, and extracts, processes, and analyzes data from the stored information in order to detect and track policy exceptions and their underlying transactions. However, as described above, a dangerous threat to business entity financial systems are the erroneous, fraudulent, or malicious actions of humans. Although the '487 system provides for the analysis of financial transactions at a business entity, it does not provide a simplified method for extracting, processing or analyzing transaction data by differentiating between human-initiated and computer-initiated activities. Furthermore, the '487 system is limited in its ability to permit an analyst to easily review all human activities associated with a particular transaction in order to determine which activities may be problematic.

The disclosed methods, systems, and computer program products provide an effective means for monitoring and auditing corporate financial activities, particularly those implemented by humans, to ensure compliance with governmental regulations, and to protect against employee fraud within an organization.

SUMMARY

In one embodiment, a method of reviewing business activity data of a business entity is disclosed. The method includes maintaining ticket records for a plurality of human-implemented jobs performed at a business entity, each ticket record including data associated with at least one of the plurality of human-implemented jobs. The method further includes monitoring, using one or more computers, all business activities that occur on a computer system of the business entity, and storing in a first log stored by one or more of the computers, a first record for each of the activities. The method additionally includes automatically extracting from the first log a set of second records, the set of second records including a record for each business activity from the first log that indicates that a job was initiated, viewed, altered, rerun, or deleted by a human. The method further includes automatically extracting from the set of second records in the second log a set of third records, and storing the set of third records in an additional log stored by one or more of the computers. The method additionally includes reviewing the set of third records to determine whether each record in the set of third records that indicates that a job was initiated, altered, rerun, or deleted by a human has a corresponding ticket record, and if a record in the set of third records indicates that a job was initiated, altered, rerun, or deleted by a human and does not have a corresponding ticket record, flagging the record.

In another embodiment, a system for reviewing business activity data of a business entity is disclosed. The system includes a plurality of stored ticket records for a plurality of human-implemented jobs performed at the business entity, each ticket record including data associated with at least one of the plurality of human-implemented jobs. The system further includes a computer program for monitoring, using one or more computers, all business activities that occur on a computer system of the business entity, and a first log stored by one or more of the computers. The first log may include a first record for each of the activities. The system may additionally include a set of second records automatically extracted from the first log. The set of second records may include, for each business activity from the first log that indicates that a job was initiated, viewed, altered, rerun, or deleted by a human, a record including a set of data. The system may further include an additional log stored by one or more of the computers, the additional log including a set of third records automatically extracted from the set of second records in the second log. In addition, the system may include a display for displaying the additional log and displaying ticket records, to permit a user to review the additional log for abnormalities, wherein if a record in the set of third records indicates an abnormality, one or more of the record in the set of third records, its associated first record, its associated second record, or its corresponding ticket, includes a flag.

In a further embodiment, a computer-readable medium having stored thereon a computer program that causes one or more computers to perform a method is disclosed. The method includes maintaining ticket records for a plurality of human-implemented jobs performed at a business entity, each ticket record including data associated with at least one of the plurality of human-implemented jobs. The method further includes monitoring, using one or more of the computers, all business activities that occur on a computer system of the business entity, and storing in a first log on one or more of the computers, a first record for each of the activities. The method additionally includes automatically extracting from the first log a set of second records, the set of second records including a record for each business activity from the first log that indicates that a job was initiated, viewed, altered, rerun, or deleted by a human. The method further includes automatically extracting from the set of second records in the second log a set of third records, and storing the set of third records in an additional log on one or more of the computers. The method additionally includes reviewing the set of third records to determine whether each record in the set of third records that indicates that a job was initiated, altered, rerun, or deleted by a human has a corresponding ticket record, and if a record in the set of third records indicates that a job was initiated, altered, rerun, or deleted by a human and does not have a corresponding ticket record, flagging the record.

BRIEF DESCRIPTION OF THE DRAWINGS

FIG. 6 is a diagram of an exemplary data record consistent with certain disclosed embodiments.

DETAILED DESCRIPTION

Figure 1A:
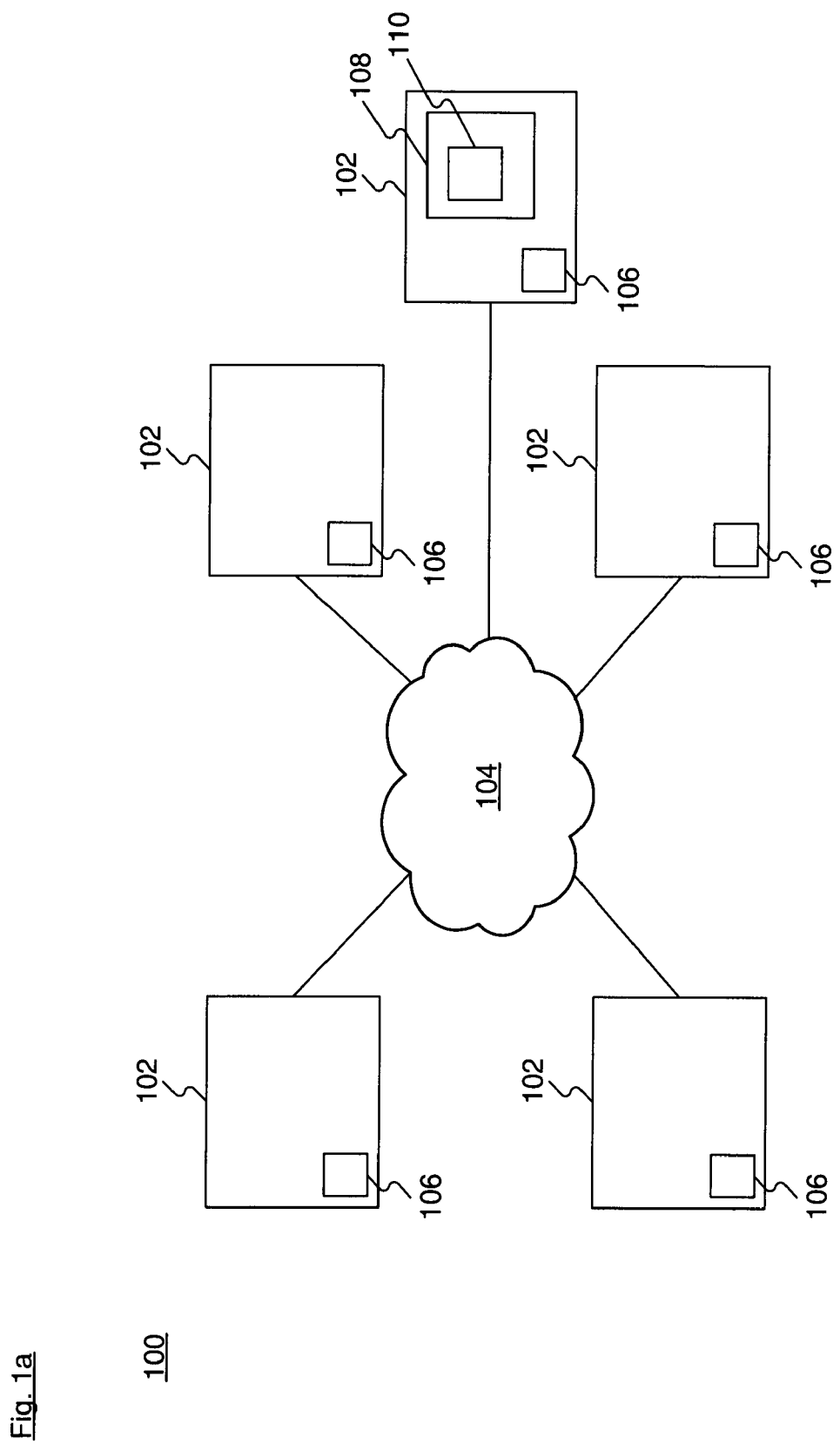
FIG. 1a is a diagram of an exemplary system consistent with certain disclosed embodiments.

Certain monitoring computer programs, such as, for example, IBM's Tivoli Workload Scheduler® software, monitor and maintain a system log of all activity that occurs on the computer system of a business entity (e.g., corporation, other organization, or portion thereof). An exemplary business entity computer system is depicted in FIG. 1a. Computer system 100 may include, for example, one or more computers 102 which communicate over a network 104 such as the Internet, an intranet, LAN, WAN, or other communication network. In one embodiment, the computer system 100 may be a mainframe computer system. A monitoring computer program 106 may be stored on a computer readable storage medium (e.g., hard drive, CD-ROM, DVD-ROM, flash memory, etc.) on one of more of the computers of computer system 100 to monitor all of the activities that occur on the computer system 100. For example, for each activity that occurs on computer system 100, data associated with the activity may be sent via network 104 to a storage area 108 (e.g., RAM, ROM, or other memory storage) on one of computers 102. The data may be stored as part of a system log 110. Although storage area 108 and system log 110 are depicted in FIG. 1a as being on one computer 102, the storage area 108 and system log 110 may alternatively be distributed across a number of computers 102 on the business entity's computer system 100.

In one embodiment, system log 110 may be in the form of a text file. However, system log 110 may be in other forms, such as, for example, a database structure. System log 110 may record all activities taken by the computer system of an organization, including activities related to financial transactions. It may include, for example, records for any actions taken on the computer system that relate to company operations, such as invoices created, payroll transactions, accounts receivable transactions, accounts payable transactions, general ledger transactions, etc. It also may include records for any actions taken in the business entity's computer system to view the record of a previous activity, to change or delete the data associated with a previous activity, or to cancel or rerun the previous activity. In this way, a record of all new activities, changes, reruns, or deletions of old logged activities on the business entity's computer system is maintained. System log 110 may also include a record for each attempt to perform actions on the business entity's computer system 100 that results in complete or partial failure (i.e. error), as well as a record of reruns or attempted reruns of failed actions and modifications to failed actions. System log 110 may further include a record of tests performed on the business entity's computer system 100 (e.g., quality assurance reviews of business activities).

Each activity that requires the execution of one or more steps within the business entity's computer system 100 may be referred to as a job. For example, a job may include an invoice transaction that creates an invoice for a customer, a payroll transaction that makes a payment to an employee or changes an annual salary, direct deposit account number, address, etc., of an employee, an accounts receivable or accounts payable transaction that reflects payments due to the business entity or payments to be made by the business entity, or any other transaction that relates to the movement of funds associated with the business entity. A job may include a test routine that checks for errors in the business entity's logistics system. A job may include the processing or movement of products to, from, or within the business entity (e.g., product movement within a warehouse, product deliveries, product manufacturing activity). The term "job" refers to jobs that complete (completed jobs), jobs that partially execute but then fail ("partially failed jobs"), jobs that fail to execute (failed jobs), completed, failed, or partially failed jobs that are rerun (re-runs), and updates or changes to completed jobs (updated jobs).

In one embodiment, every activity within the business entity that is recorded in a ticket or should be recorded in a ticket is also automatically recorded as a job in system log 110 when it executes or attempts to execute on the business entity's computer system 100. Because a human is required to fill out a ticket for every computer-executed job initiated by a human, all jobs recorded in system log 110 that are initiated by a human should have an associated ticket. However, the possibility exists that a job in system log 110 that should have an associated ticket will not have one. The disclosed embodiments provide an efficient method for discovering which jobs in system log 110 do not have associated tickets, and for further investigating these jobs.

Data associated with each job that executes in computer system 100 is stored in system log 110. The data may include, for example, a time and date of the job, a job identifier, a person code indicating a person who implemented the job, an action taken (action code), a computer name of a computer that executed the job, a key number, a detailed record of the steps taken during the job, and other data related to the job. New activities that relate to an original job (e.g., re-runs; updated jobs; reads (i.e., views) of the original job, re-run, or updated job; deletions of data associated with the original job, re-run, or updated job, etc.), are also recorded in the system log and may include a reference to the original job identifier. In this way, all activities associated with a particular job that occur on computer system 100 can be identified. For example, if a completed job record is read by a user, a record of the read date and time, viewing user, and the detailed original job data may be stored as a new record in the system log. Additional information associated with the job read may be included in the new record as well (e.g., viewing workstation, file location of the viewed job, etc.).

Figure 1B:
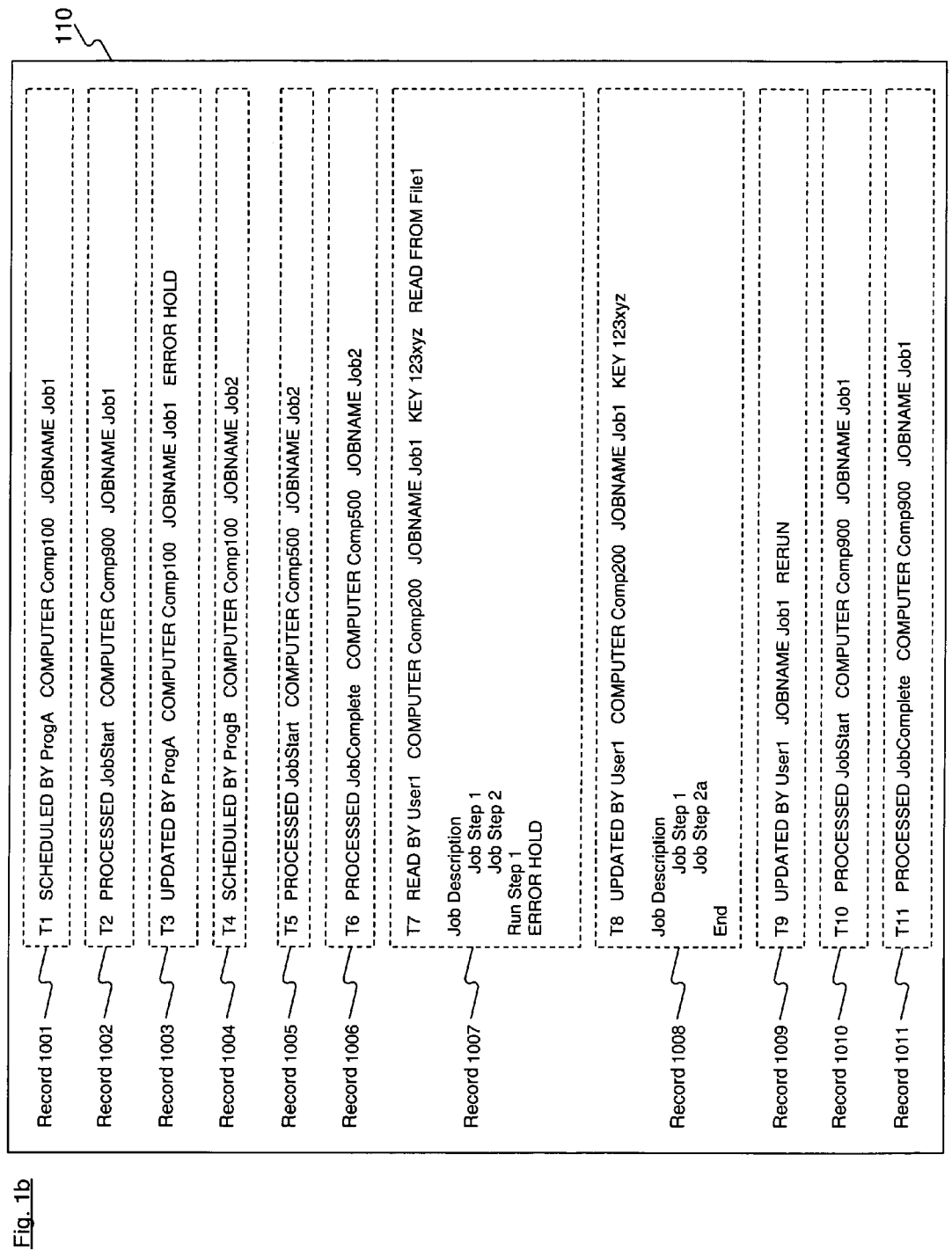
FIG. 1b is a diagram of an exemplary log consistent with certain disclosed embodiments.

An exemplary depiction of a portion of system log 110 and data stored in system log 110 is shown in FIG. 1b, which shows a conceptual description of information which may be included in records stored in system log 110. Though only a small number of records are shown, an actual system log 110 may have a much larger number of records (e.g., tens or hundreds of thousands, millions, etc.).

FIG. 1b shows exemplary records for a set of job-related activities that occurred on a business entity computer system between times T1 and T11. For example, Record 1001 indicates that at time/date T1, a job with name Job1 was scheduled by computer program ProgA of computer Comp100. The job may be, for example, a financial transaction to be initiated and completed at a particular computer. Record 1002 indicates that at time/date T2, Job1 was processed by being started (i.e., initiated) at computer Comp900. Record 1003 indicates that at time/date T3, Job1, which was initiated at T2 (Record 1002), was updated at T3 by program ProgA of computer Comp100. In the example shown in Record 1003, Job1 was updated by being put on hold because of an error. In one embodiment, an error that causes a job to be put on hold is reported to an administrator who may view, update, and rerun the job (described below in connection with Records 1007-1009).

While Job1 is on hold, Record 1004 of system log 110 indicates that an additional job named Job2 was scheduled at time/date T4 by program ProgB at computer Comp100. Record 1005 indicates that Job2 was processed by being started at computer Comp500 at time/date T5. As shown in Record 1006, Job2 on Comp500 was completed at time/date T6.

In one embodiment, a user may view a completed, partially failed, or failed job. For example, in the example above where a job error causes a job to be placed on hold, a message may be sent to an administrator so the administrator can intervene and remedy the failed job. A first step toward remedying a failed job may include the administrator locating the job in progress in order to examine why it erred. Record 1007 indicates that at time/date T7, Job1 (which was on hold) was read by a human, identified as User1 from computer Comp200. Record 1007 further indicates that User1 supplied a key 123xyz, which provided authorization to read the job. In addition, the Record 1007 indicates a "read from" location, which indicates the file name from which the record was located. Furthermore, Record 1007 includes the detailed description of the job and the steps that occurred during the job. In the example shown, Record 1007 indicates that Job Step 1 was run, but then an error occurred, and Job1 was put on hold.

In one embodiment, after a user views a job, the user may update the job to ensure that it executes correctly. Record 1008 indicates that at time/date T8, Job1 was updated by User1 at computer Comp200. Record 1008 further indicates that User1 supplied a key 123xyz, and updated the job by removing Job Step 2 and adding Job Step 2a. Record 1009 indicates that at time/date T9, User1 updated Job1 by selecting to rerun the job. Records 1010 and 1011 indicate that Job1 was started and successfully completed on computer Comp900 at respective times T10 and T11.

As described above, system log 110 includes a record of all activity that occurs on a business entity's computer system related to human-initiated jobs. The log may be reviewed to determine all human-initiated activities which may constitute potential unauthorized activities or errors. However, because a business entity's computer system may includes many thousands of computers, the size of system log 110 at the end of one day may include hundreds of thousands of records, or even more, which could take many hours or even days for an administrator to review for potential errors.

Figure 2A:
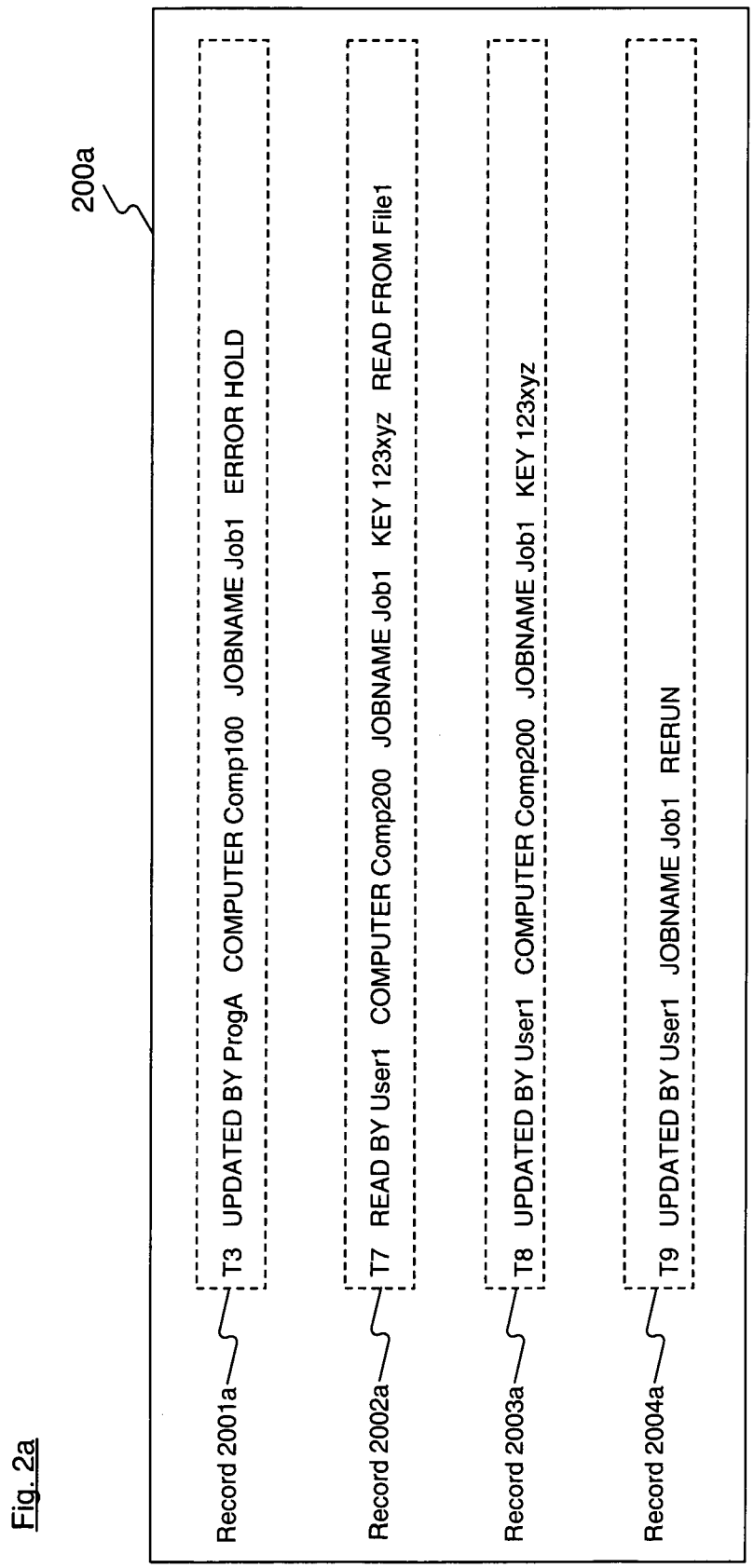
FIG. 2a is a diagram of a further exemplary log consistent with certain disclosed embodiments.
Figure 3:
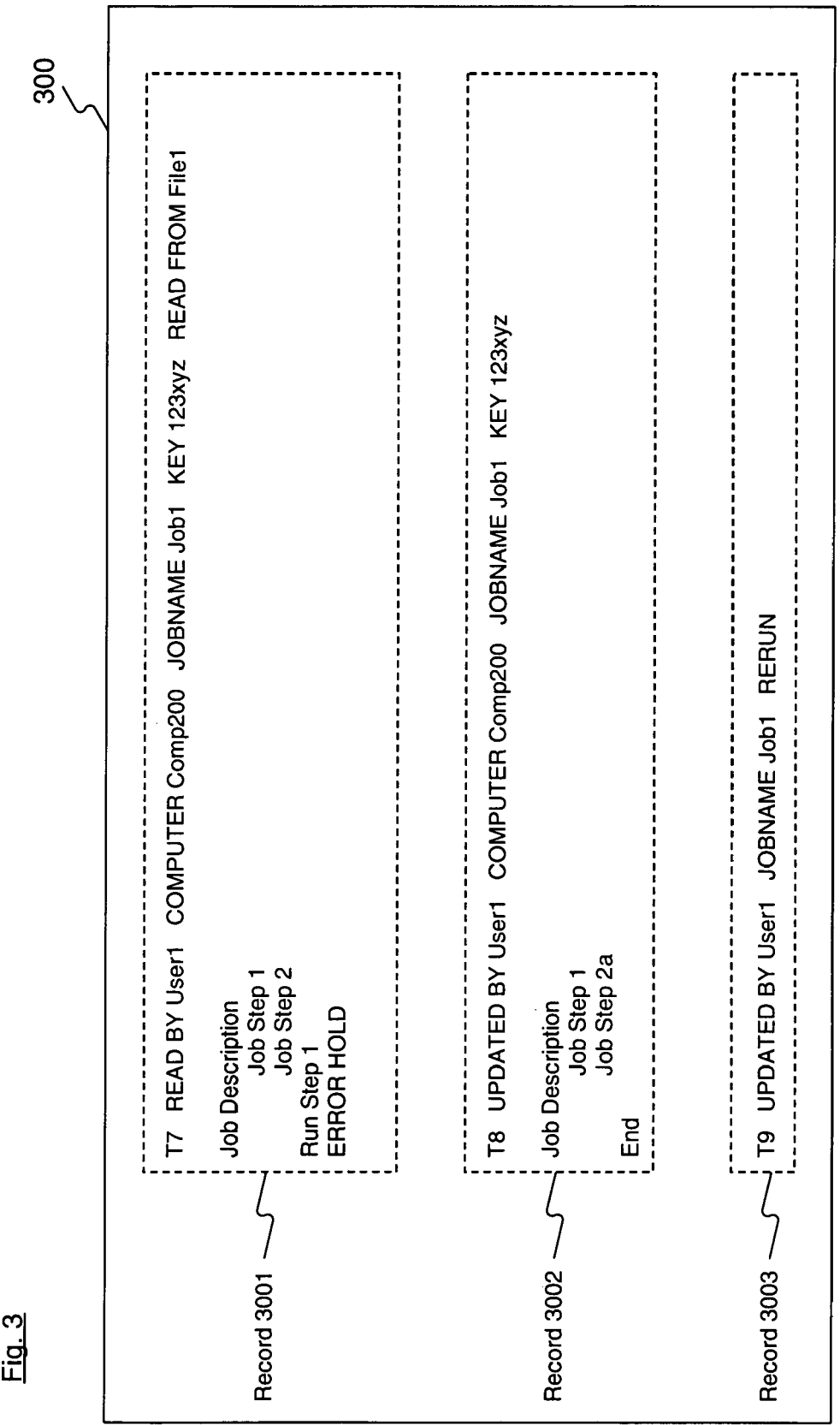
FIG. 3 is a diagram of a further exemplary log consistent with certain disclosed embodiments.

In one embodiment, a first computer program (e.g., Restructured Extended Executor ("REXX") script, or other programming language script) running on the business entity's computer system 100 executes an automated process to extract data from system log 110 and store certain extracted data in a second log (FIG. 2a, 200a) and other extracted data in a third log(FIG. 3, 300). In one embodiment, the same computer 102 stores system log 110, stores and runs the first computer program, and stores the second log 200a and third log 300. The second log 200a may include a set of second records, and the third log 300 may include a set of third records. The terms "second," "third," etc., are used only to designate the separate logs and records, and are not used to denote any priority or preferential order. The second and third logs may each be a database, text file, or other data structure capable of storing the extracted data. In one embodiment, the logs may be stored in a memory storage area at a computer 102 of computer system 100.

In one embodiment, data extracted and stored in the second log 200a includes data associated with jobs touched by a human (e.g., jobs initiated, read by, updated, or re-run by a user), and data associated with failed or partially failed jobs. In another embodiment, data extracted and stored in the second log 200a includes only data associated with jobs touched by a human. Thus, the second log 200a may include a record for every activity executed on a business entity's computer system and stored in the system log for which a human was involved in the activity, and may also include a record for every computer-implemented activity which resulted in a failure, or partial failure (referred to collectively as an "error"). In one embodiment, as depicted in FIG. 2a, the records in the second log 200a may include, for each record, all of the data extracted from the system log 110 that identifies the job. In one embodiment, detailed information describing the specific steps executed for each executed job is not included in the records in the second log 200a. For example, in log 200a, Record 2001a corresponds to Record 1003 in system log 110, Record 2002a corresponds to Record 1007 in system log 110 (minus the details describing the steps executed for the job), Record 2003a corresponds to Record 1008 in system log 110 (again, minus the details describing the steps to be executed for the job), and Record 2004a corresponds to Record 1009 in system log 110.

The data stored in the second log 200a may be further limited by eliminating certain data from each record. To do so, a delimited second log 200b (FIG. 2b) may be created that includes further delimited data for each record. For example, in one embodiment, a second script may be run that extracts for each record in the second log 200a only data fields indicating time/date (e.g., T3, T7, etc.), action (e.g., UPDATED BY, READ BY, etc.), the implementer of the action (e.g., ProgA, User1, etc.), an action description which further describes why the action was taken (e.g., ERROR, RERUN, etc.), a job name field (e.g., Job1, etc.), and an error code field (e.g., HOLD, etc.).

Time/date field may be two separate fields, one for time and one for date. Or time/date field may be combined as a single field. In addition to "updated by" and "read by" actions, action field may include an indication of actions such as inserted, deleted, hold (e.g., a program remains on hold), and released (e.g., released from hold). Implementer field may indicate an identification of a human (i.e., a user) who initiates or carries out (i.e., implements) an action on computer system 100, or a computer program that initiates and carries out an action on computer system 100. The job name field may include an identifier that identifies the job. Though shown as "Job1" in log 200a and 200b, the job name identifier may include certain alphanumeric characters which further characterize the job type, job location, or other information about the job. The error code field may include a description of the error that caused the action, if the action description indicates an error.

In one embodiment, two separate computer program scripts could be used to create a delimited log 200b that includes data extracted from system log 110. Alternatively, the second log 200a itself may be delimited by extracting only the desired data fields of each desired record from the system log 110. Thus, in one embodiment, a single computer program script may be used to create a log as shown in 200b that includes data extracted from system log 110.

In one embodiment, a third log 300 may be created based on data extracted from system log 110. For example, data extracted and stored in the third log 300 may include only data associated with jobs touched by a human (e.g., jobs initiated, read by, updated, or re-run by a user).

In one embodiment, the third log 300 may include a record for every activity stored in the system log 110 in which a human was involved in the activity. Each record in the third log 300 may include the same action-identifying data stored in the second log 200a for each record corresponding to the same activity recorded in the second log, and may also include detailed information describing the specific steps executed for the activity. For example, as shown in FIG. 3, Record 3001 includes the same action-identifying data stored in Record 2002a of log 200a, and also includes the detailed job execution information included in Record 1007 of system log 110. Similarly, Record 3002 includes the same action identifying data stored in Record 2003a of log 200a, and also includes the detailed job execution information included in Record 1008 of system log 110. In this way, the third log 300 serves as a detailed log of all human implemented activity occurring on computer system 100, including all steps taken during all jobs touched by humans. The third log 300 can therefore be referenced to verify which steps of jobs completed correctly, and may be further referenced to ensure that all human-implemented activities that affect finances within the business entity are accounted for.

Figure 2B:
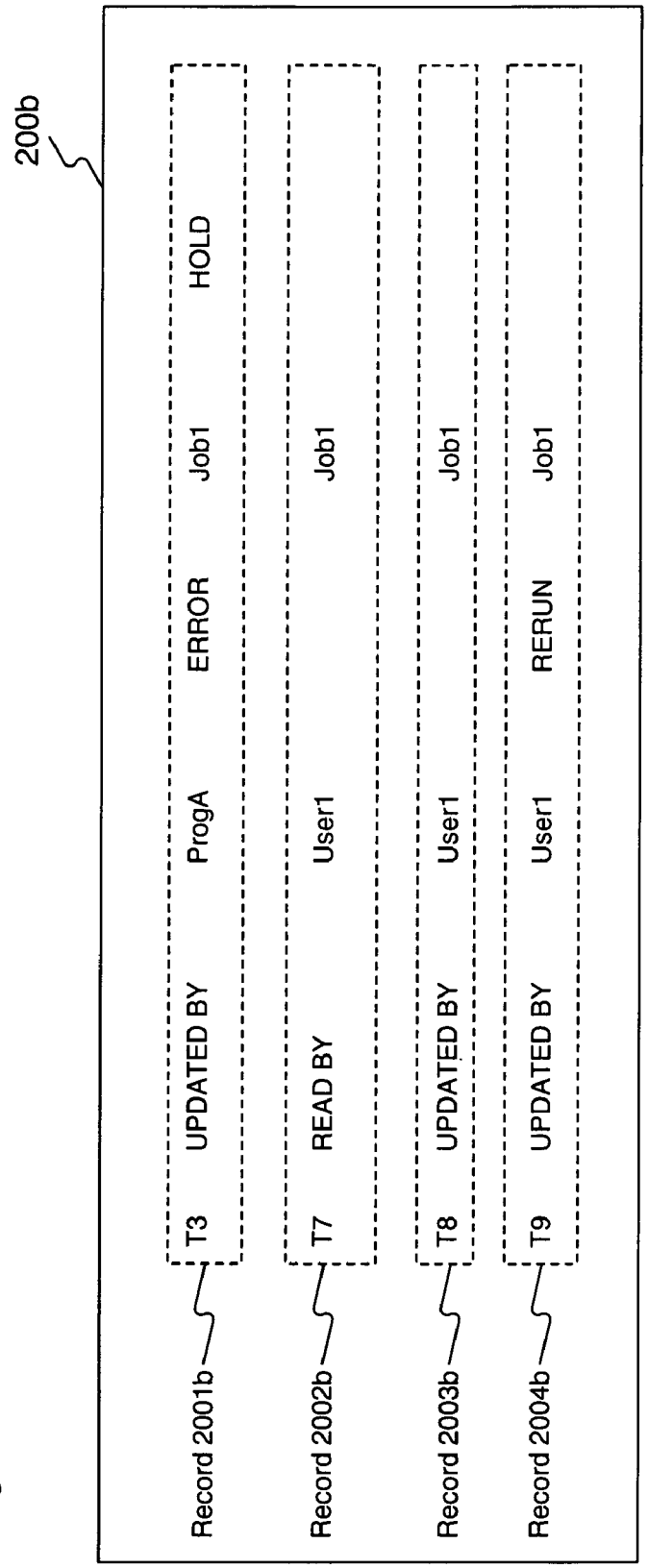
FIG. 2b is a diagram of a further exemplary log consistent with certain disclosed embodiments.
Figure 4:
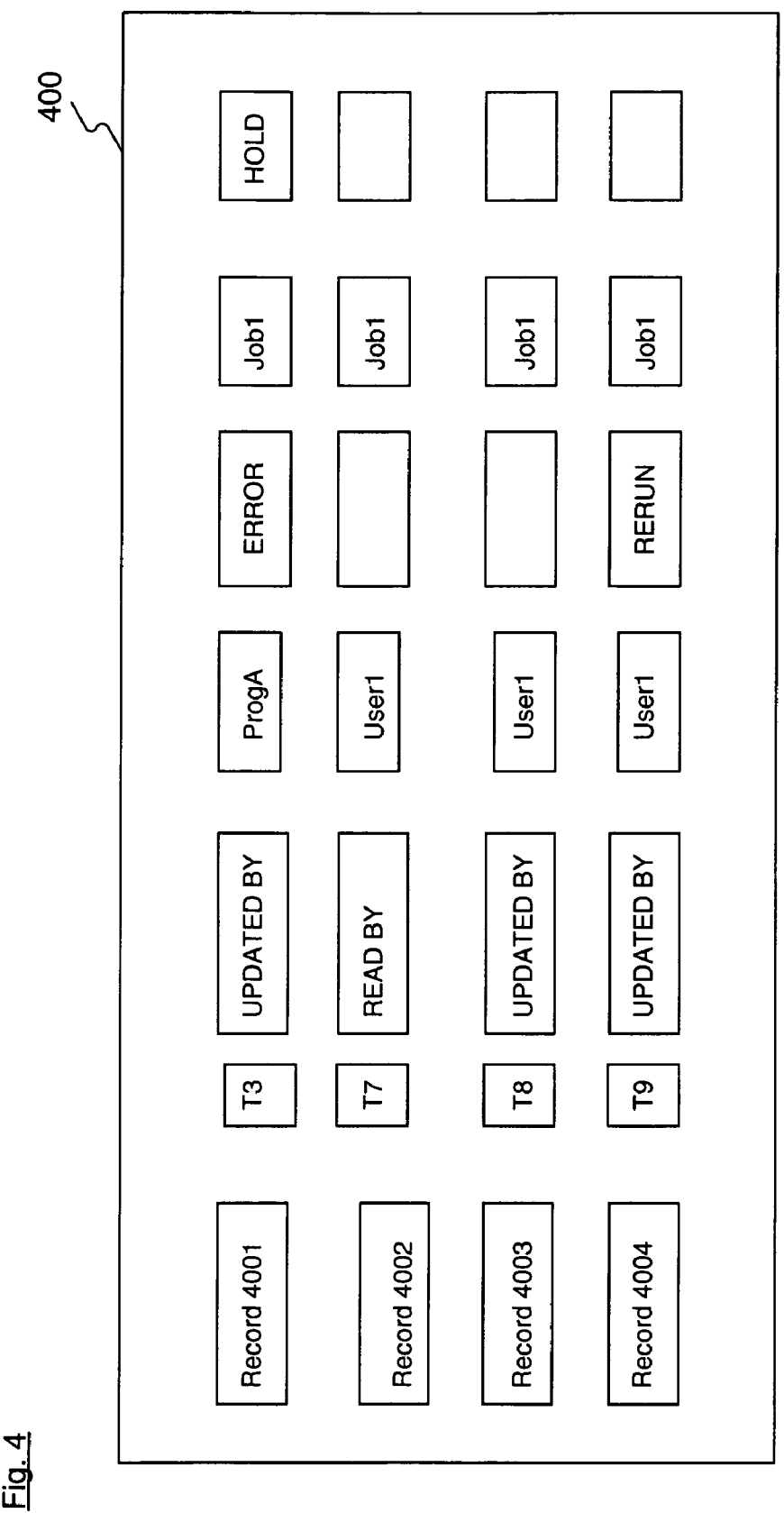
FIG. 4 is a diagram of a further exemplary log consistent with certain disclosed embodiments.

The data in the second log 200a or 200b may then be analyzed to determine which records in the log may include data desired to be reviewed to ensure compliance with governmental regulations. In one embodiment, for example, the second log 200a or 200b, as depicted in FIGS. 2a and 2b, may be a text file where each line or group of associated lines represents a record. In this embodiment, the records in the text file may be loaded into a database (e.g., a Microsoft Access database) according to certain filtering criteria, to create a fourth log 400 (FIG. 4). In one embodiment, a third computer program script may include the filtering criteria and may perform steps to create the fourth log 400. The filtering criteria may include, for example, rules for including only certain types of records in the fourth log 400 (e.g., records that have a certain job type, such as financially significant activity records such as payroll records, general ledger-related records, etc.; or records reflecting jobs performed at a particular facility, such as a corporate headquarters facility, etc., which jobs may also indicate financially significant activity). In one embodiment, for example, the rules may filter records based on a job code, which indicates the job type. For example, instead of using job codes of Job1 and Job2 as described above, job codes of xxyyJob1 and xxyyJob2 may be used, where "xx" is a variable code that indicates a job type (e.g., "GL" may indicate general ledger transaction jobs, "PY" may indicate payroll transaction jobs, etc.), and "yy" is a variable code that indicates a facility for the job (e.g., "WH" may indicate warehouse, "CP" may indicate corporate headquarters, etc.).

The filtering rules may additionally delimit the particular types of data fields to be maintained for each record in the fourth log 400. For example, certain data fields in the second log 200a or 200b, such as the "key" field and "read from" field in FIG. 2a may not be included in the fourth log 400. An exemplary depiction of a portion of fourth log 400, according to one embodiment, is shown in FIG. 4. Although all of the records that appear in second log 200a of FIG. 2a and delimited second log 200b of FIG. 2b also appear in fourth log 400 of FIG. 4, the logs 110, 200a, 200b, 300, and 400 depicted herein are exemplary only, and include a small number of records for explanation purposes only. Actual logs 110, 200a, 200b, 300, and 400 may include many more records than the numbers shown in FIGS. 2a, 2b, 3, and 4, such that log 400 would not include all of the same records and/or fields as logs 200a or 200b. For example, in one embodiment, logs 200a and 200b may include records for jobs related to business activity testing jobs that do not reflect additions or changes to financial-related information on computer system 100 of the business entity. In one embodiment, testing-type records are not included in log 400. In certain embodiments, system log 110 may include data for tens or hundreds of thousands of records, logs 200a or 200b may include data for hundreds or thousands of records, and log 400 may include data for still fewer records than logs 200a or 200b.

In one embodiment, the result of the extraction and filtering steps described above is a populated database (e.g., fourth log 400) that includes records for only human-implemented activities and/or failed or partially failed jobs that occurred on the business entity's computer system, which activities or jobs relate to financial information which is likely to be useful in auditing the business entity for purposes of governmental regulation. For example, the database may include only records for jobs related to financially significant activity, such as payroll activities, general ledger activities, accounts payable activities, accounts receivable activities, etc., and records for additional human activities of reading those jobs, updating those jobs, deleting those jobs, or otherwise viewing or altering the jobs. The resulting database may include a relatively small number of records (e.g., 100, 200, etc.) compared to the extensive number of records in the system log 110 (e.g., tens or hundreds of thousands). As such, the records may be all-inclusive of desired information for regulatory compliance auditing, and may still be manageable for a business entity employee (e.g., a financial administrator) to review in a short period of time.

In one embodiment, an administrator may review the resulting database to search for records that may indicate an abnormality or problem. For example, in one embodiment, an administrator may review each record of log 400 relating to a human-initiated activity to ensure regulatory compliance by ensuring that each record has a corresponding ticket in the business entity's ticket database, and if a corresponding ticket exists, by checking whether particular information recorded in the ticket (e.g., implementer, action description, etc.) matches the corresponding information (e.g., implementer code, job description, etc.) in the record or associated records in logs 110, 200a, 200b, or 300. If an associated ticket does not exist or is not consistent with the corresponding record or associated records, the ticket, record and/or any corresponding record in logs 110, 200a, 200b, or 300 may be flagged for further review. For example, certain data or records may be highlighted, marked with a specific symbol (e.g., a checkmark, "x," etc.), or otherwise visually marked for further review. These flagged records may indicate human activity that was unauthorized, erroneous, fraudulent, or otherwise improper, and/or may further indicate activities that were proper but were not properly recorded in the system and which, therefore, may fail to be in compliance with governmental record-keeping regulations. Additional corporate resources (e.g., additional financial officers, legal representatives, internal auditing department staff, etc.) may then be utilized to investigate and remedy the abnormality prior to an outside audit by a governmental entity.

Figure 5:
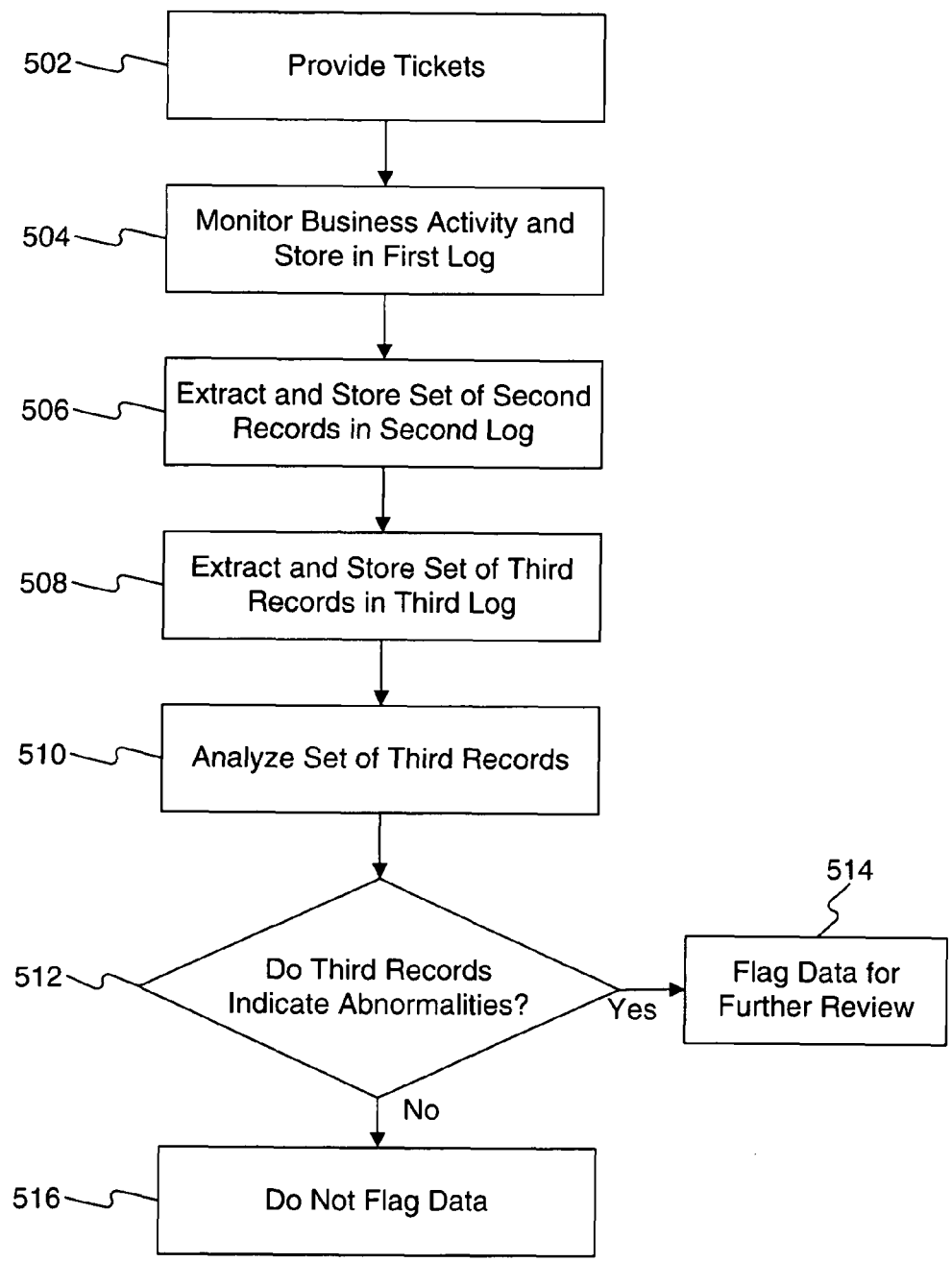
FIG. 5 is a flowchart depicting an exemplary method consistent with certain disclosed embodiments.

FIG. 5 depicts an exemplary method 500 consistent with certain disclosed embodiments. In step 502, a plurality of tickets are provided. In one embodiment, the tickets are created by a human to record a financial activity implemented by the human. The tickets may be maintained, for example, electronically in a ticket database, or on paper or other recording media, and may include individual records storing information such as, for example, date, time, implementer, location, action, action description, etc. An exemplary ticket 600 is shown in FIG. 6. In one embodiment, ticket 600 may be filled out via an electronic form accessible via a computer program, and may include one or more entry areas to be partially or wholly filled out by a user.

In step 504, activities taken by a computer system of a business entity are monitored and stored in a first log. For example, in one embodiment, a monitoring computer program on a monitoring computer receives a notification of all business-related activities taken on all computers in a business entity's computer system, and maintains a system log 110 of those activities, such as depicted in FIG. 1b and as described above.

In step 506, a set of second records for failed or partially failed jobs and for human-touched data is extracted from the first (e.g., system) log, and is stored in a second log. For example, a log such as depicted in FIG. 2a or 2b may be automatically created, which stores records from failed or partially failed jobs on the computer system and for jobs on the computer system that have been initiated, viewed, altered, deleted, added to, etc., by human operators. In one embodiment, only records for human-touched data are stored in the second log.

In step 508, a set of third records is automatically created based on data extracted from the second log. The set of third records may be stored in a third log. For example, in one embodiment, the set of third records includes information such as depicted in FIG. 3. The data extracted from the second log may be extracted, for example, based on certain data fields included in the second log, and based on certain types of records included in the second log. For example, records in the third log may be delimited by removing certain data fields from the records stored in the second log. Furthermore, certain records in the second log may not be included in the third log based on the type of jobs in the record or other criteria associated with the record (e.g., job types or locations that indicate financially significant activity). In one embodiment, the set of third records is stored in a database format such that a user can easily view a list including the set of third records. In other embodiments, the set of third records could be stored in a textual or other data format.

In step 510, data from the set of third records is analyzed for potential problematic activity. For example, a user may print the log or view the log on a display screen to search for potential problems or abnormalities. In one embodiment, for example, an administrator may review each record of the third set of records to ensure regulatory compliance by ensuring that each record that indicates human-initiated activity has a corresponding ticket in the business entity's ticket database, and if a corresponding ticket exists, by checking whether particular information recorded in the ticket (e.g., implementer, action description, etc.) matches the corresponding information (e.g., implementer code, job description, etc.) in the corresponding record or associated records in logs 110, 200a, 200b, or 300. The administrator may, for example, search the database of stored tickets by entering associated information from the third record (e.g., time stamp data, implementer data, etc.) as search criteria for the ticket database, and may review the data from the retrieved ticket or tickets on a computer screen, printout, or other display device. If the identifying data in a retrieved ticket matches the identifying data in the third record, then the administrator may determine that an appropriate ticket exists for the job recorded in the third record. The administrator may then compare the third record and its associated records against ticket to check for consistency. The analysis may alternatively be carried out by a computer program, which may be programmed to compare certain information from each third record to information stored in a ticket database (e.g., time stamp data, implementer data, etc.) to ensure that a corresponding ticket exists and is consistent with its corresponding record(s).

In step 512, it is determined whether the third records indicate any potential abnormalities. If a potential abnormality exists (step 512, "Yes")—for example, if an associated ticket does not exist or is not consistent with its corresponding record or associated records, the ticket, record, and/or any associated records (e.g., records in logs 110, 200a, 200b, or 300) may be flagged for further review (step 514). For example, certain data or records may be highlighted, marked with a specific symbol (e.g., a checkmark, "x," etc.), or otherwise visually marked for further review. Of a potential abnormality is not found to exist (step 512, "No") then the record is not flagged (step 516). The flagged records may indicate human activity that was unauthorized, erroneous, fraudulent, or otherwise improper, and/or may further indicate activities that were proper but were not properly recorded in the system and which, therefore, may fail to be in compliance with governmental record-keeping regulations. Additional corporate resources (e.g., additional financial officers, legal representatives, internal auditing department staff, etc.) may then be utilized to investigate and remedy the abnormality prior to an outside audit by a governmental entity.

Although the steps in FIG. 5 are shown in a particular order, they need not be performed in that particular order. For example, certain steps in FIG. 5 may be carried out concurrently, or may be combined into a single step. For example, the extraction steps described in steps 506 and 508 may be combined into a single process (e.g., by combining the disclosed computer program scripts into a single script) such that data is extracted from records in the first log to create, in one process, the set of third records to be analyzed by an administrator.

INDUSTRIAL APPLICABILITY

The disclosed systems and methods may be used to monitor any type of business data for any business entity or portion of a business entity. For example, in one embodiment, the disclosed system and method may be used to monitor business activity related to logistics within a business entity. However, in other embodiments, it may be used to monitor business activity related to manufacturing, services, and/or other activities within a business entity. In one embodiment, the disclosed systems and methods may be used for a corporation, privately owned business, governmental agency, non-profit organization, educational institution, or other company or organization. In other embodiments, the disclosed systems and methods may be used to monitor data of a portion of a corporation, privately owned business, governmental agency, non-profit organization, educational institution, or other company or organization, such as a branch or a subsidiary of such a company or organization. The term "business entity" as used herein may refer to any of a corporation, privately owned business, governmental agency, non-profit organization, educational institution, other company or organization, or portion thereof.

Furthermore, the data collected and analyzed in each log may be for any desired period of time and can include any number of records. For example, in one embodiment, data in system log 110 may be collected every second or hundredth of a second. Data extracted and placed into logs 200a, 200b, 300, and/or 400 may be extracted on an hourly basis, a daily basis, every other day, etc. In one embodiment, the system log is a text-based file that includes a few hundred thousand lines of text indicating a few hundred thousand logged activities, logs 200a and 200b are text-based files that include a few hundred lines of text including data for a few hundred extracted logged activities, log 300 is a text-based file that includes a few thousand lines of text indicating data for a few hundred extracted logged jobs, and log 400 is a database file that includes a few hundred records including data for a few hundred logged activities.

It will be apparent to those skilled in the art that various modifications and variations can be made to the method and system for reviewing business activity of a business entity. Other embodiments will be apparent to those skilled in the art from consideration of the specification and practice of the disclosed embodiments. It is intended that the specification and examples be considered as exemplary only, with a true scope being indicated by the following claims and their equivalents.

What is claimed is:

1. A method of reviewing business activity data of a business entity, comprising:
   maintaining ticket records for a plurality of human-implemented jobs performed at a business entity, each ticket record including data associated with at least one of the plurality of human-implemented jobs;
   monitoring, using one or more computers, all business activities that occur on a computer system of the business entity;
   storing in a first log stored by one or more of the computers, a first record for each of the activities;
   determining, for each record stored in the first log, whether the job was initiated, viewed, altered, rerun, or deleted by a human by checking for a person code associated with the record;
   automatically extracting from the first log a set of second records, the set of second records for each business activity from the first log that indicates that a job was initiated, viewed, altered, rerun, or deleted by a human;
   automatically extracting a set of third records from the set of second records;
   storing the set of third records in a readable textual format in an additional log stored by one or more of the computers;
   reviewing the set of third records to determine whether each record in the set of third records that indicates that a job was initiated, altered, rerun, or deleted by a human has a corresponding ticket records; and
   when a record in the set of third records indicates that a job was initiated, altered, rerun, or deleted by a human and does not have a corresponding ticket record, flagging the record.

2. The method of claim 1, wherein each record in the set of second records includes a time and date for the activity, and an indicator of a job with which the record is associated.

3. The method of claim 1, wherein automatically extracting the set of third records from the set of second records further includes:
   for each record in the set of second records, determining one or more of: a type of business activity associated with the record, and a facility at which the activity recorded in the record occurred.

4. The method of claim 1, wherein automatically extracting the set of third records from the set of second records further includes:
   for each record of the set of second records, determining whether the record is associated with a financial transaction.

5. The method of claim 4, wherein determining whether the record is associated with a financial transaction further includes:
   determining whether the record is associated with at least one of: a payroll transaction, an accounts receivable transaction, an accounts payable transaction, and a general ledgers transaction.

6. The method of claim 1, wherein the set of second records further includes a record for each business activity that comprises a failed or partially failed job.

7. The method of claim 1, further including:
   automatically extracting from the first log a set of further records, the set of further records including, for each job that involves data viewed, altered, added, or deleted by a human, a record including a set of data that identifies the job and a set of data that describes the steps executed during the job.

8. A computer system for reviewing business activity data of a business entity, comprising:
   at least one computer, at least one storage medium, at least one monitoring computer program, and a least one system log stored on the storage medium;
   a plurality of stored ticket records for a plurality of human-implemented jobs performed at the business entity, each ticket record including data associated with at least one of the plurality of human-implemented jobs;
   a computer program for monitoring, using one or more computers, all business activities that occur on a computer system of the business entity;

a first log stored by one or more of the computers, the first log including a first record for each of the activities;

a person code for each record indicating a job initiated, viewed, altered, rerun, or deleted by a human, and stored in the first log, wherein the person code indicates a human who has viewed, altered, rerun, or deleted the job;

a set of second records automatically extracted from the first log, the set of second records including, for each business activity from the first log that indicates that a job was initiated, viewed, altered, rerun, or deleted by a human, a record including a set of data;

an additional log stored by one or more of the computers, the additional log including a set of third records automatically extracted from the set of second records, the third set of records is in a readable text format; and when a record in the set of third records indicates an abnormality, one of more of the record in the set of third records, its associated first record, its associated second record, or its corresponding ticket, includes a flag;

wherein the abnormality indicates that a job was initiated, altered, rerun, or deleted by a human and does not have a corresponding ticket record.

9. The computer system of claim 8, wherein each record in the set of second records includes a time and date for the activity, and an indicator of a job with which the record is associated.

10. The computer system of claim 8, wherein:

each record in the set of second records includes one or more of: a type of business activity associated with the record, and a facility at which the activity recorded in the record occurred; and one or more of the type and the facility indicate which records from the set of second records have been included in the set of third records.

11. The computer system of claim 8, wherein:

each record in the set of second records is associated with at least one financial transaction; and the financial transaction indicates which records from the set of second records have been included in the set of third records.

12. The computer system of claim 8, wherein the at least one financial transaction includes at least one of: a payroll transaction, an accounts receivable transaction, an accounts payable transaction, and a general ledger transaction.

13. The computer system of claim 8, wherein the set of second records further includes a record for each business activity that comprises a failed or partially failed job.

14. The computer system of claim 8, further including:

a set of further records automatically extracted from the first log, the set of further records including, for each job that involves data viewed, altered, added, or deleted by a human, a record including a set of data that identifies the job and a set of data that describes the steps executed during the job.

15. A computer-readable storage medium having stored thereon a computer program that causes one or more computers to perform a method, the method comprising:

maintaining ticket records for a plurality of human-implemented jobs performed at a business entity, each ticket record including data associated with at least one of the plurality of human-implemented jobs;

monitoring, using one or more of the computers, all business activities that occur on a computer system of the business entity;

storing in a first log on one or more of the computers, a first record for each of the activities;

determining, for each record stored in the first log, whether the job was initiated, viewed, altered, rerun, or deleted by a human by checking for a person code associated with the record;

automatically extracting from the first log a set of second records, the set of second records including a record for each business activity from the first log that indicates that a job was initiated, viewed, altered, rerun, or deleted by a human;

automatically extracting a set of third records from the set of second records;

storing the set of third records in an additional log on one or more of the computers in a readable text format;

reviewing the set of third records to determine whether each record in the set of third records that indicates that a job was initiated, altered, rerun, or deleted by a human has a corresponding ticket record; and when a record in the set of third records indicates that a job was initiated, altered, rerun, or deleted by a human and does not have a corresponding ticket record, flagging the record.

16. The computer-readable storage medium of claim 15, the method further including: for each record of the set of second records, determining whether the record is associated with a financial transaction.

17. The computer-readable storage medium of claim 16, wherein determining whether the record is associated with a financial transaction includes determining whether the record is associated with at least one of: a payroll transaction, an accounts receivable transaction, an accounts payable transaction, and a general ledgers transaction.

\* \* \* \* \*